(No Model.)  4 Sheets—Sheet 1.

G. E. DOW.
VALVE GEAR FOR COMPOUND ENGINES.

No. 330,387.  Patented Nov. 17, 1885.

Witnesses:
Geo. H. Strong.
J. H. Nourse.

Inventor
Geo. E. Dow
By Dewey & Co
Attorneys (No Model.) 4 Sheets—Sheet 2.
G. E. DOW.
VALVE GEAR FOR COMPOUND ENGINES.
No. 330,387. Patented Nov. 17, 1885.

Witnesses: Inventor
Geo. E. Dow
By Dewey & Co.

(No Model.) 4 Sheets—Sheet 3.
G. E. DOW.
VALVE GEAR FOR COMPOUND ENGINES.
No. 330,387. Patented Nov. 17, 1885.
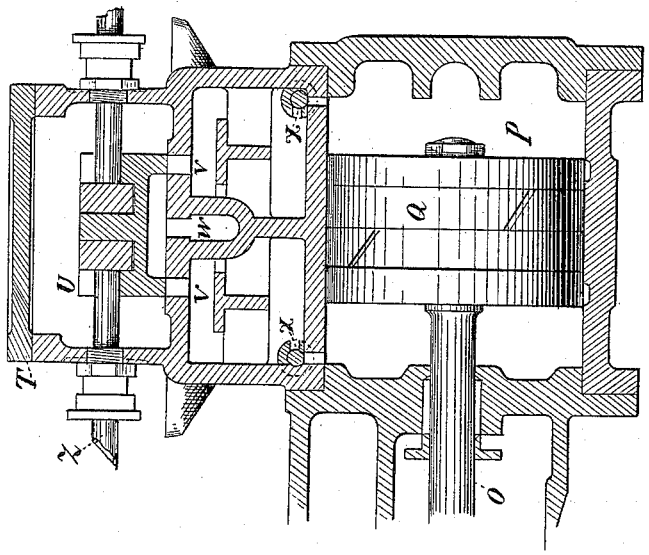
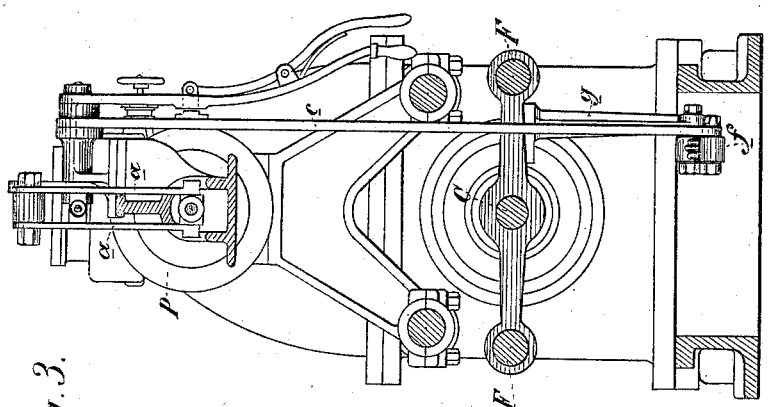
Witnesses,
Geo. H. Strong
Inventor,
Geo. E. Dow
By Dewey & Co.
Attorneys (No Model.) 4 Sheets—Sheet 4.

G. E. DOW.
VALVE GEAR FOR COMPOUND ENGINES.

No. 330,387. Patented Nov. 17, 1885.

Witnesses,
Geo. H. Strong.

Inventor,
Geo. E. Dow
By Dewey & Co.
Attorneys

UNITED STATES PATENT OFFICE.

GEORGE E. DOW, OF SAN FRANCISCO, CALIFORNIA.

VALVE-GEAR FOR COMPOUND ENGINES.

SPECIFICATION forming part of Letters Patent No. 330,387, dated November 17, 1885.

Application filed May 16, 1884. Serial No. 131,751. (No model.)

*To all whom it may concern:*

Be it known that I, GEO. E. DOW, of the city of San Francisco, county of San Francisco, and State of California, have invented an Improvement in Valve-Gears for Compound Engines; and I hereby declare the following to be a full, clear, and exact description thereof.

My invention relates to certain improvements in valve-gear for compound engines.

It consists in a novel construction of the valves and means for operating same, and it is particularly applicable to that class of engines which is used for pumping and which have no rotating parts.

Figure 1:
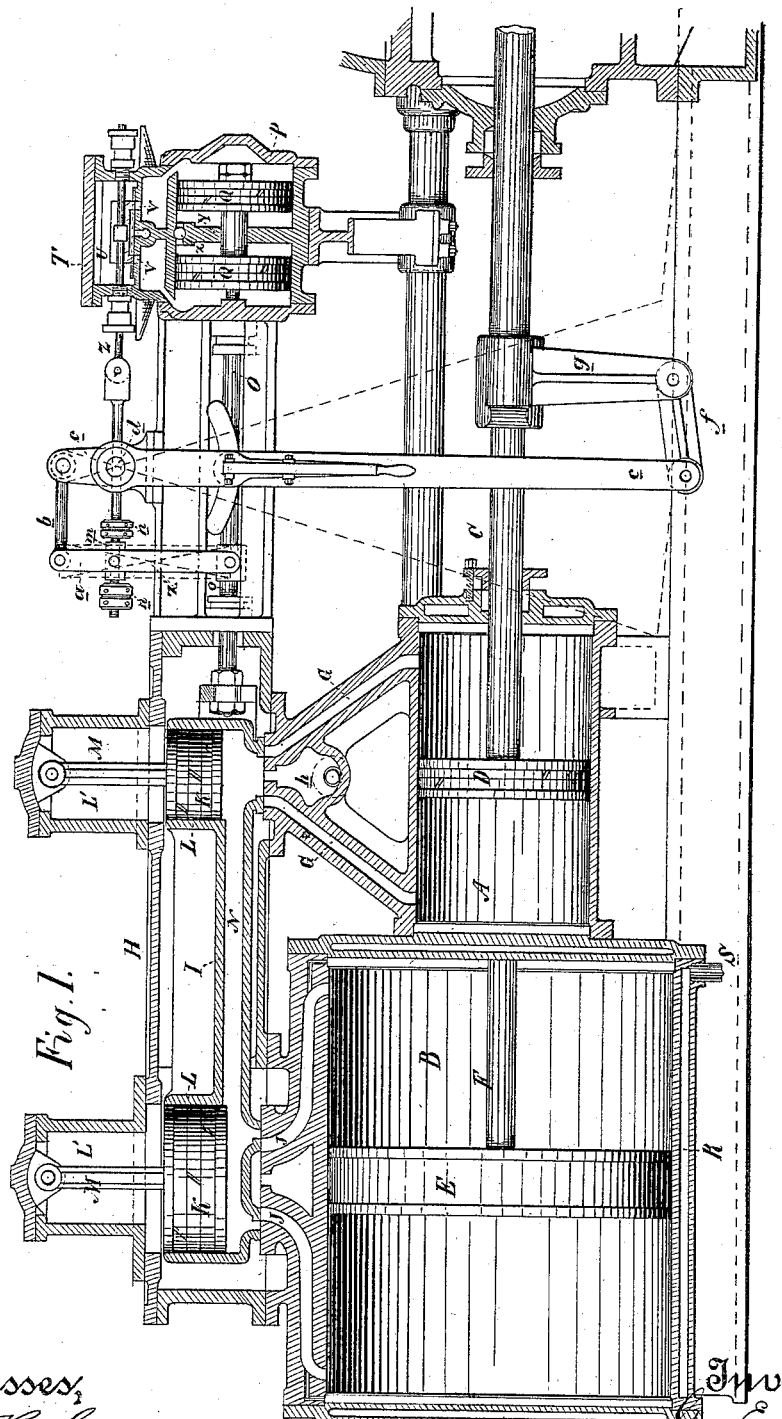
Figure 2:
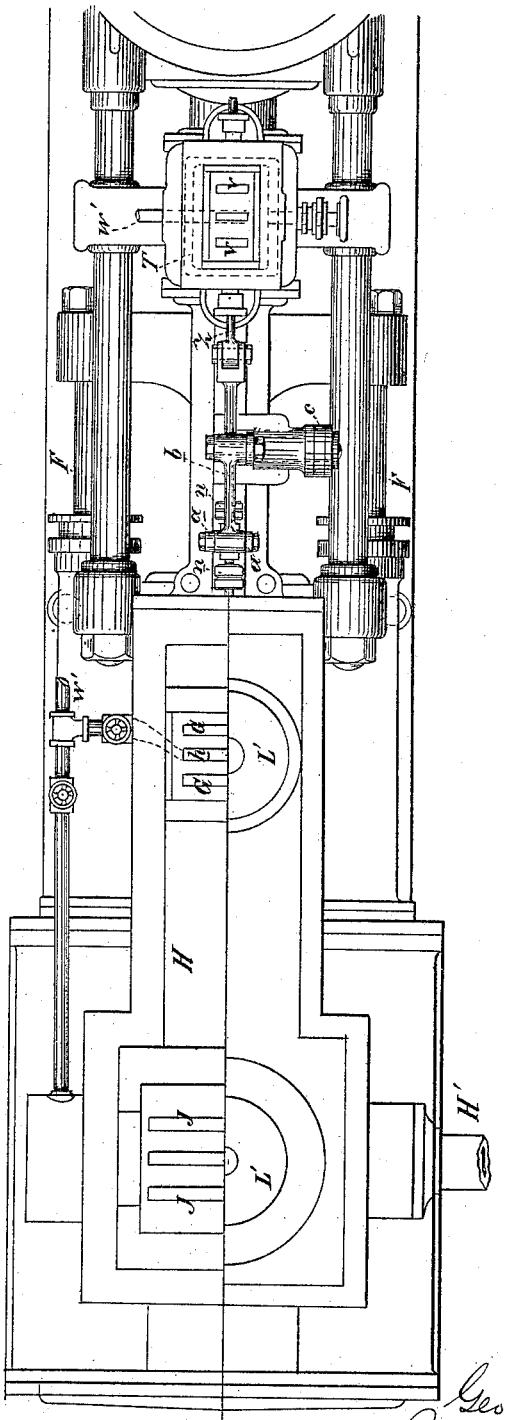
Figure 4:
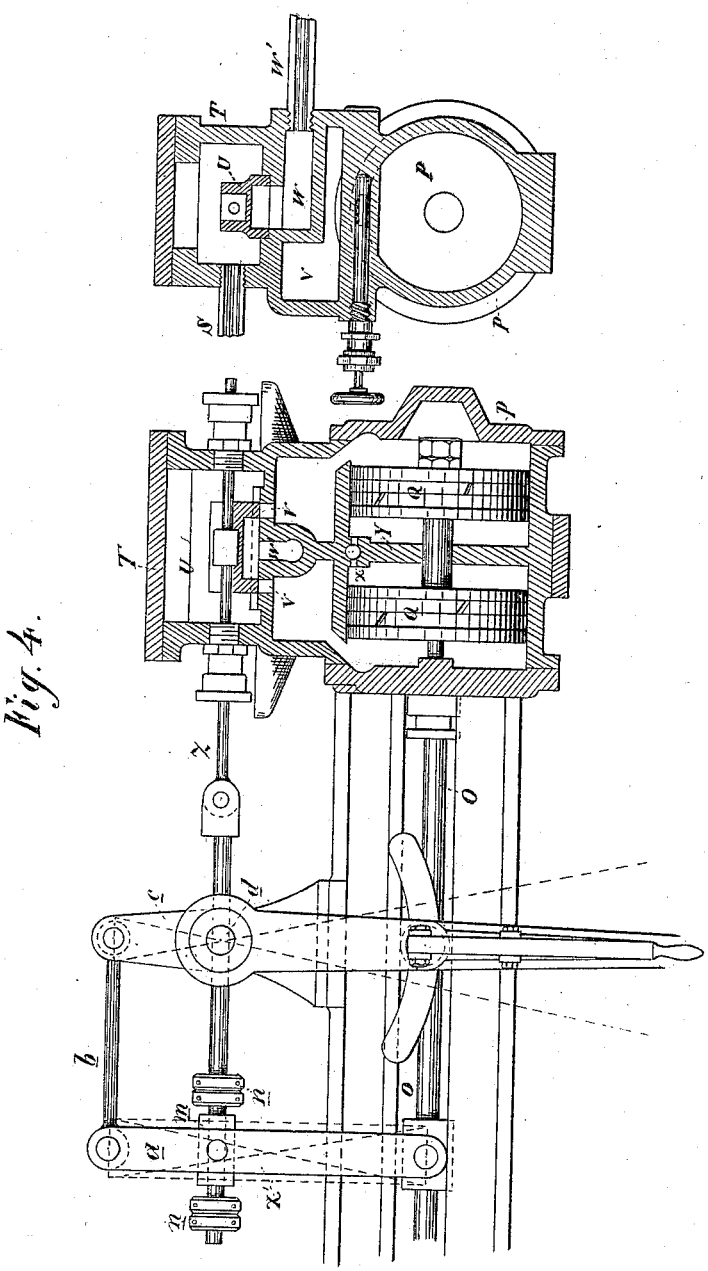

Referring to the accompanying drawings for a more complete explanation of my invention, Figure 1 is a longitudinal section of a compound direct-acting steam-engine having high-pressure and low-pressure cylinders, showing valves, connecting-levers, and operating mechanism. Fig. 2 is a plan or top view showing a part of the engine-valve faces and that of the auxiliary cylinder. Fig. 3 is a transverse section across the guides, showing the cross-head and the lever connecting with the auxiliary engine. Fig. 4 is an enlarged view of the auxiliary cylinder and mechanism. Fig. 5 is a modification of the same.

In the present case I have shown my invention as applied to a compound engine having high-pressure cylinder A and low-pressure cylinder B. A single piston-rod, C, passes through the stuffing-box in the end of the high-pressure cylinder and connects with the piston D, by which it and the pump or other mechanism with which it may be connected are caused to reciprocate. The cylinders A and B are placed in a line with each other, so that the axis of one is continuous with and coincides with that of the other.

E is the piston of the low-pressure cylinder, and it is connected with the same cross-head with the piston-rod C by means of rods F, which connect with each side of it and extend along outside of the cylinder A, the smaller diameter of the latter allowing of this construction. Steam is admitted alternately into the opposite ends of the cylinder A from the boiler, and is exhausted therefrom through ports G, which lead into the steam-chest H. This steam-chest has a single continuous chamber extending over both high and low pressure cylinders, and contains a long double-ended main steam-valve, I, the two ends of which travel upon valve-faces over the ports G of the cylinder A and the ports J of the cylinder B.

K K are balance-pistons fitted into short cylinders or chambers L on the top of each end of the valve, above the seats, and suspended from the upper part of the chambers L by links M, as shown.

The valve I is constructed with a single passage, N, through it, which receives steam alternately from the ports G G, or from the intermediate receiver of the high-pressure cylinder, as the valve is reciprocated, and conducts it to the low-pressure cylinder, where it is alternately admitted to and exhausted from the opposite ends of this cylinder by movement of the valve in the ordinary manner of slide-valves.

Steam is admitted into the valve-chamber H through a pipe, H', Fig. 2, and it is also admitted thence into the jacket surrounding the low-pressure cylinders, as hereinafter described, thus keeping up the temperature of the expanding steam in the latter, and within the valve I, as well as supplying live steam to the high-pressure cylinder as the valve opens the ports.

The valve I is operated by a stem or rod, O, which extends into the auxiliary cylinder P, and connects with a piston or pistons, Q, which are operated as follows: A jacket, R, surrounds low-pressure cylinder B, and live steam from the boiler is admitted to this jacket, serving the purpose of keeping the interior of the cylinder hot, and preventing the condensation of the steam as it expands to work within this cylinder.

S is a pipe connected with the lowest point of the chamber R, so that the steam or the products of its condensation will escape through this pipe, which leads into the valve-chamber T of the auxiliary engine, before described. Within this chamber is a D or slide-valve, U, moving over three ports, arranged in the usual manner, for the admission and exhaust of the steam or propelling medium. The supply-ports V are enlarged, as shown, between the valve-chamber and the ends of the cylinder P, so that the steam or the water condensed therefrom, which passes through the pipe S, may fill this enlarged portion, and also the cylinder P. If a single piston be used in this cylinder, the water of condensation or other medium will alternately follow the piston from either end, and be forced out as it returns, passing out through the passage V, and thence into the exhaust-passage W.

In Figs. 1 and 4 I have shown two pistons moving within this cylinder P, and between them a diaphragm, through which the rod which connects the pistons together may slide. An opening, X, is made in this diaphragm, with a valve by which the opening may be controlled. The water which fills the cylinder at both ends also enters the space between the piston and this central diaphragm, Y, by leakage around the pistons, and the air at first in the space is displaced and escapes around the pistons or through a cock arranged for the purpose. As the pistons move the water is forced through the opening X, from one side to the other of the diaphragm. The rate at which it is allowed to pass is determined by the amount of opening, and it will be seen from this that the movement of the pistons Q, which are actuated by the pressure of live steam from the chamber R, around the low-pressure cylinder B, or, if desired, directly from the boiler, will be controlled and regulated by the amount of opening X, and the rapidity with which the medium in this chamber is allowed to pass through from side to side of the diaphragm Y. As these pistons Q are fixed upon the end of the valve-rod O of the operating-valve I, it will be seen that this valve can only be moved as fast as the pistons move, and, consequently, while being actuated by the pressure of live-steam, it is not allowed to move rapidly from one end to the other of its stroke. Fig. 5 shows single piston and openings for the same purpose. The small slide-valve U, which admits the steam or water into the cylinder P, is connected by the rod Z with a link, $a$, one end of which is connected by suitable mechanism to the main piston-rod or cross-head, so that its motion coincides with that of the main piston, but with a reduced length of stroke. In the present case I have shown this connection as being made by means of a rod, $b$, which connects the upper end of the link $a$ with the lever-arm $c$, which is journaled upon the fulcrum-pin at $d$. The lower end of this lever $c$ is connected by link $f$ with an arm, $g$, which is secured to the cross-head of the main piston-rod, so that as this rod reciprocates it carries the lower end of the lever-arm $c$ in an arc of a circle, equal to the stroke of the piston-rod. The lower end of the link $a$ is connected with the valve-stem O. The auxiliary valve-stem Z is connected with the link $a$ by means of a sleeve, $m$, through which the rod slides freely. This sleeve has studs or pins, which enter holes in the two parts of the link $a$, these being situated upon each side of the sleeve. Nuts $n$, upon the rod at each end of the sleeve, are adjusted to limit the distance which the rod slides through the sleeve, and thus allow any desired amount of lost motion to this auxiliary valve. The connection of the auxiliary valve-stem with the link $a$ is made at such a point as to give proper lead to the auxiliary valve when the main and auxiliary pistons are both at the same end of their stroke.

It will be seen that although the medium within the cylinder P, its valve-chamber, and passages will be mostly composed of the water of condensation from the chamber R around the cylinder B, still as this is under pressure equal to that within the boiler, it will have a temperature considerably higher than the boiling-point of water in an ordinary condition of atmospheric pressure. As a consequence, this water is always ready to be evaporated into steam whenever the pressure is reduced. When, therefore, it exhausts into the passage W, beneath the auxiliary valve U, it passes through a pipe, $w'$, into the intermediate steam-receiver, $h$, which also receives the steam as it exhausts from the high-pressure cylinder A, and from this receiver the steam passes through a passage, N, in the valve I into the low-pressure cylinder B, as before described. As the products of condensation pass from the auxiliary engine into this receiver, they are subjected to a less pressure than within the auxiliary engine, and consequently become evaporated, and the steam thus produced unites with that discharged from the high-pressure cylinder and passes along with it into the low-pressure engine, thus economizing the heat to the best advantage. By this arrangement the water of condensation is allowed to be retained in the chambers of the auxiliary-engine, and the surplus may be re-evaporated into the intermediate receiver, $h$, so that its remaining force may be exerted upon the low-pressure piston the same as steam used from the high-pressure cylinder. The chambers V of the auxiliary cylinder act as a steam-trap for the products of condensation from the cylinder-jacket R, and these products serve to operate the auxiliary engine, for the purpose of controlling the movement of the auxiliary piston, and through it the main engine-valve, without the employment of a special cataract cylinder. The operation would then be as follows: When the main pistons are moving to the left, the upper end of the link $a$ will be moved in an opposite direction, but at a reduced stroke, thereby opening the port to move the auxiliary piston to the right, the speed being regulated by the valve in the passage X of the intercepting diaphragm Y. By this means the movement of the main valve is entirely controlled by the auxiliary valve, which is thus moved by the engine nominally, and by the auxiliary engine differentially—that is, the upper end of the link $a$ coincides in movement with that of the main piston and the other end of the link is connected with the main valve-rod and moves with the auxiliary piston connected thereto. The variation of speed between the main valve and main piston in point of time in making their stroke is regulated by the auxiliary or the influence of the lead caused by the link *a* carrying variably the fulcrum of the auxiliary valve.

Having thus described my invention, what I claim as new, and desire to secure by Letters Patent, is—

1. In a compound engine, high and low pressure cylinders with controlling-valves, and a valve-stem connected to the piston of an auxiliary engine, receiving pressure from the water of condensation in the jacket surrounding the low-pressure cylinder, said water being under boiler-pressure, substantially as and for the purpose described.

2. In a compound engine, the cylinders having their axes in line, the piston-rods, the main valve with its valve-rod, and the auxiliary engine connected thereto and to the intermediate receiver, as shown, together with the auxiliary valve-rod connected with a link, one end of which is united to the main valve-stem and the other with the main piston-rod by an intermediate lever, substantially as herein described.

3. In a compound engine, the cylinders having their axes in line, the main valve and valve-rod, the cylinder P, with the auxiliary pistons Q, and the intermediate diaphragm with the passage and regulating-valves, and the receiver intermediate between the high and low pressure cylinders with which the auxiliary engine is connected, substantially as herein described.

4. In an engine, the main cylinder with pistons, rods, valves, and valve-stem connected with an auxiliary engine, which is actuated by a medium under direct pressure from the boiler, and a receiver intermediate between the high and the low pressure cylinders into which the exhaust from the auxiliary engine is allowed to expand, as herein described.

In witness whereof I have hereunto set my hand.

GEO. E. DOW.

Witnesses:
H. C. LEE,
J. H. BLOOD.